US012408703B2

(12) United States Patent
Batista et al.

(10) Patent No.: US 12,408,703 B2
(45) Date of Patent: Sep. 9, 2025

(54) THERMAL INSULATION FOR AEROSOL-GENERATING DEVICE

(71) Applicant: Philip Morris Products S.A., Neuchatel (CH)

(72) Inventors: Rui Nuno Batista, Morges (CH); Ricardo Cali, Mannheim (DE)

(73) Assignee: Philip Morris Products S.A., Neuchatel (CH)

( * ) Notice: Subject to any disclaimer, the term of this patent is extended or adjusted under 35 U.S.C. 154(b) by 411 days.

(21) Appl. No.: 17/635,797

(22) PCT Filed: Aug. 25, 2020

(86) PCT No.: PCT/EP2020/073676
§ 371 (c)(1),
(2) Date: Feb. 16, 2022

(87) PCT Pub. No.: WO2021/037820
PCT Pub. Date: Mar. 4, 2021

(65) Prior Publication Data

US 2022/0287369 A1 Sep. 15, 2022

(30) Foreign Application Priority Data

Aug. 28, 2019 (EP) .................................... 19194026

(51) Int. Cl.
*A24F 40/485* (2020.01)
*A24F 40/20* (2020.01)
(Continued)

(52) U.S. Cl.
CPC ............ *A24F 40/465* (2020.01); *A24F 40/20* (2020.01); *A24F 40/485* (2020.01); *H05B 6/105* (2013.01); *H05B 6/42* (2013.01)

(58) Field of Classification Search
None
See application file for complete search history.

(56) References Cited

U.S. PATENT DOCUMENTS

2017/0340003 A1 11/2017 Batista et al.
2018/0070639 A1 3/2018 Chen et al.
(Continued)

FOREIGN PATENT DOCUMENTS

CN 1209731 A 3/1999
CN 1744833 A 3/2006
(Continued)

OTHER PUBLICATIONS

Hu, English translation of CN 208228311 U, Dec. 14, 2018, Copyright © 2025 Clarivate Analytics, pp. 1-5 (Year: 2018).*
(Continued)

*Primary Examiner* — Philip Y Louie
*Assistant Examiner* — Jeffrey A. Buckman
(74) *Attorney, Agent, or Firm* — Oblon, McClelland, Maier &Neustadt, L.L.P.

(57) ABSTRACT

An aerosol-generating device is provided, including: a cavity to receive an aerosol-generating article including an aerosol-forming substrate, the cavity including a base, and the base including at least one air aperture; an induction heating arrangement including a susceptor arrangement and an induction coil, and being arranged at least partly surrounding or forming the cavity; and a thermally insulating element arranged between the susceptor arrangement and the induction coil, the thermally insulating element being sealingly attached to the base so as to prevent lateral airflow in a direction perpendicular to a longitudinal axis of the device into the cavity at the base of the cavity, and one or more sidewalls of the susceptor arrangement are permeable and configured for lateral airflow to enter the cavity in the direction perpendicular to the longitudinal axis of the device.

12 Claims, 4 Drawing Sheets

(51) Int. Cl.

| | |
|---|---|
| ***A24F 40/465*** | (2020.01) |
| ***H05B 6/10*** | (2006.01) |
| ***H05B 6/42*** | (2006.01) |

(56) References Cited

U.S. PATENT DOCUMENTS

| | | | | |
|---|---|---|---|---|
| 2018/0184713 | A1* | 7/2018 | Mironov | A24F 40/30 |
| 2018/0310623 | A1 | 11/2018 | Batista | |
| 2021/0059310 | A1* | 3/2021 | Rogan | A24F 40/48 |
| 2022/0183368 | A1* | 6/2022 | Abi Aoun | A24F 40/20 |

FOREIGN PATENT DOCUMENTS

| | | | |
|---|---|---|---|
| CN | 203762288 | U | 8/2014 |
| CN | 104095291 | A | 10/2014 |
| CN | 106235418 | A | 12/2016 |
| CN | 206443204 | U | 8/2017 |
| CN | 107920602 | A | 4/2018 |
| CN | 208228311 | U | 12/2018 |
| JP | 2006-519355 | A | 8/2006 |
| JP | 2018-529324 | A | 10/2018 |
| RU | 2 509 516 | C2 | 3/2014 |
| RU | 2 611 487 | C2 | 2/2017 |

OTHER PUBLICATIONS

International Search Report and Written Opinion issued Oct. 27, 2020 in PCT/EP2020/073676 filed on Aug. 25, 2020, 13 pages.

Extended European Search Report issued Feb. 20, 2020 in European Application No. 19194026.1 filed on Aug. 28, 2019, 8 pages.

International Preliminary Report on Patentability issued Nov. 30, 2021 in PCT/EP2020/073676 filed on Aug. 25, 2020, 7 pages.

Written Opinion issued Apr. 19, 2021 in PCT/EP2020/073676 filed on Aug. 25, 2020, 5pages.

Combined Chinese Office Action and Search Report issued Sep. 21, 2023 in Chinese Patent Application No. 202080056917.7 (with English Translation), 14 pages.

Russian Office Action issued Oct. 6, 2022 in Russian Patent Application No. 2022104967/07 (with unedited computer generated English Translation), 14 pages.

Japanese Office Action issued on Feb. 6, 2023 in Japanese Patent Application No. 2022-512320 (with English translation), 10 pages.

* cited by examiner

THERMAL INSULATION FOR AEROSOL-GENERATING DEVICE

CROSS-REFERENCE TO RELATED APPLICATIONS

This application is a U.S. national stage application of PCT/EP2020/073676, filed on Aug. 25, 2020, which is based upon and claims the benefit of priority under 35 U.S.C. § 119 from European patent application no. 19194026.1, filed Aug. 28, 2019, the entire contents of each of which are incorporated herein by reference.

TECHNICAL FIELD

The present invention relates to an aerosol-generating device.

It is known to provide an aerosol-generating device for generating an inhalable vapor.

DESCRIPTION OF THE RELATED ART

Such devices may heat aerosol-forming substrate to a temperature at which one or more components of the aerosol-forming substrate are volatilised without burning the aerosol-forming substrate. An aerosol-forming substrate may be provided as part of an aerosol-generating article. The aerosol-generating article may have a rod shape for insertion of the aerosol-generating article into a cavity, such as a heating chamber, of the aerosol-generating device. A heating arrangement may be arranged around the heating chamber for heating the aerosol-forming substrate once the aerosol-generating article is inserted into the heating chamber of the aerosol-generating device. The heating arrangement may be configured as an induction heating arrangement. For induction heating, the heating arrangement may comprise an induction coil and a susceptor arrangement. The susceptor arrangement may be arranged at least partly surrounding the heating chamber. The induction coil may be arranged surrounding the susceptor arrangement. During operation, heating of the susceptor arrangement may lead to an increase of temperature of the induction coil in addition to heating the aerosol-generating article received in the heating chamber. The temperature increase of the induction coil may negatively influence operation of the induction coil. Exemplarily, the electrical resistance of the induction coil may increase. Furthermore, heat may be lost so that energy efficiency of the aerosol-generating device may be negatively influenced.

It would be desirable to have an aerosol-generating device comprising an induction heating arrangement with improved operational efficiency. It would also be desirable to have an aerosol-generating device comprising an induction heating arrangement with improved heating efficiency.

SUMMARY

According to an embodiment of the invention, there is provided an aerosol-generating device comprising a cavity for receiving an aerosol-generating article comprising aerosol-forming substrate. The cavity comprises a base. The base comprises at least one air aperture. The device further comprises an induction heating arrangement. The induction heating arrangement comprises a susceptor arrangement and an induction coil. The induction heating arrangement is arranged at least partly surrounding or forming the cavity. The device further comprises a thermally insulating element. The thermally insulating element is arranged between the susceptor arrangement and the induction coil. The thermally insulating element is sealingly attached to the base to prevent lateral airflow into the cavity at the base of the cavity.

BRIEF DESCRIPTION OF THE DRAWINGS

The invention will be further described, by way of example only, with reference to the accompanying drawings in which.

DETAILED DESCRIPTION

Figure 1:
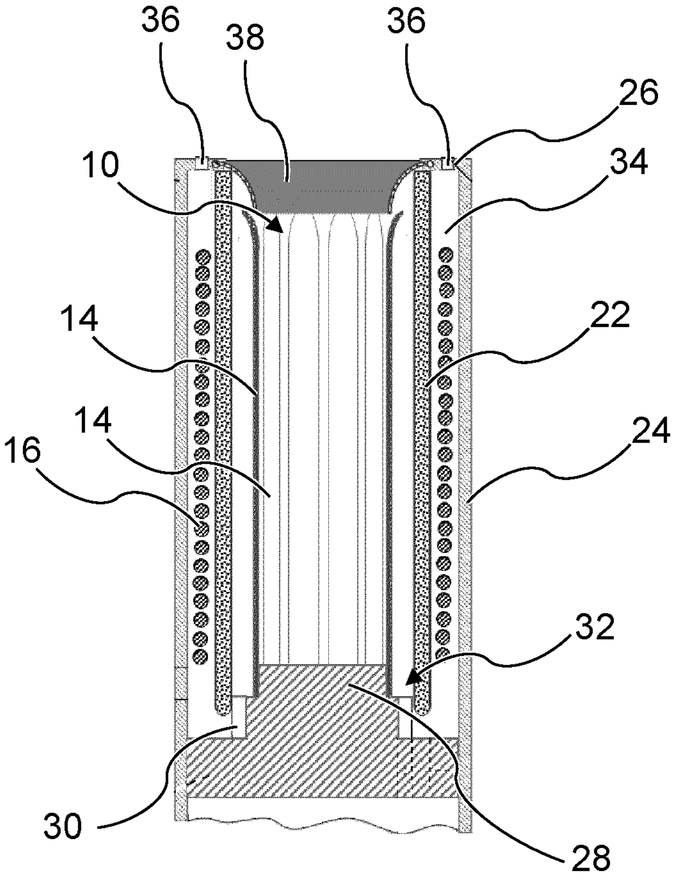
FIG. 1 shows a cross-sectional view of an aerosol-generating device according to the present invention.

The air aperture arranged in the base enables axial airflow into the cavity. The airflow into the cavity is enabled in an axial direction, while airflow into the cavity in a lateral direction is prevented by the thermally insulating element. An axial airflow may improve the flow of air into the aerosol-generating article, the axial airflow may direct the airflow into the upstream end face of the aerosol-generating article. In order to attach the thermally insulating element to the base of the cavity, the thermally insulating element may be glued to the base of the cavity. The upstream end face of the thermally insulating element may be glued to the base of the cavity. Alternatively, the thermally insulating element may extend over the base of the cavity such that an inner side face of the thermally insulating elements may be attached to the base of the cavity such as by gluing.

The susceptor arrangement may comprise one or more sidewalls of the susceptor arrangement. The one or more sidewalls of the susceptor arrangement may be permeable for lateral airflow to enter the cavity. The sidewalls of the susceptor arrangement may be formed from blade shaped susceptors a lateral airflow may enter the cavity through gaps between the blade-shaped susceptors. The one or more sidewalls of the susceptor arrangement may comprise perforations or slits such that a lateral airflow may enter the cavity through the perforations or slits.

The thermally insulating element may comprise one or more sidewalls of the thermally insulating element. A gap may be provided between the one or more sidewalls of the susceptor arrangement and the one or more sidewalls of the thermally insulating element. The gap may allow air to flow within the gap. An axial airflow within the gap may be provided. An axial route for the airflow may be provided by the gap to enable a lateral airflow into the cavity at different axial positions. The gap my advantageously improve thermal insulation between the susceptor arrangement and the thermally insulating element.

The one or more sidewalls of the thermally insulating element may be arranged to be substantially air tight in a lateral direction preventing lateral airflow to exit the cavity.

The one or more sidewalls of the thermally insulating element may coaxially surround the one or more sidewalls of the susceptor arrangement. The one or more sidewalls of the thermally insulating element may partly or fully form the sidewall of the cavity and the one or more sidewalls of the susceptor arrangement may be arranged adjacent to the one or more sidewalls of the thermally insulating element towards the interior of the cavity.

The one or more sidewalls of the susceptor arrangement may be permeable for lateral airflow to enter the cavity and a gap may be provided between the one or more sidewalls of the susceptor arrangement and the one or more sidewalls of the thermally insulating element. The air permeable sidewalls of the susceptor arrangement may be made airtight to prevent lateral airflow from exiting the cavity by the sidewalls of the insulating element.

The term "sealingly attached" may refer to an attachment between the thermally insulating element and the base such that airflow is prevented in the area of the attachment. In other words, a seal might be provided by the attachment between the thermally insulating element and the base.

The term "lateral" may refer to a direction perpendicular to the longitudinal axis of the aerosol-generating device.

The air aperture may have a longitudinal extension in the axial direction of the aerosol-generating device. The air aperture may have a circular cross-section. The air aperture may have an elongate, elliptical or rectangular cross-section.

The thermally insulating element may partly or fully form the sidewall of the cavity. The thermally insulating element may partly or fully extend along the axial length of the cavity. The thermally insulating element may directly abut the base of the cavity. The thermally insulating element may be directly attached to the base of the cavity, thereby facilitating the sealing attachment between thermally insulating element and the base.

The aerosol-generating device may comprise a housing, wherein the cavity may be arranged in a downstream end of the housing. The thermally insulating element may be sealingly attached to the downstream end of the housing to prevent lateral airflow into the cavity at the downstream end of the cavity.

According to this embodiment, the thermally insulating element preferably fully forms the sidewall of the cavity or extends along the full axial length of the cavity. The thermally insulating elements prevent lateral airflow into the cavity at the base of the cavity by means of the sealing attachment to the base of the cavity. Further, the thermally insulating element, according to this embodiment, prevents lateral airflow into the cavity at the downstream end of the cavity by attachment between the thermally insulating element and the housing of the aerosol-generating device. In this embodiment, airflow into the cavity is preferably only enabled through the air aperture arranged in the base of the cavity.

The thermally insulating element may have a flat downstream end face. The flat downstream end face may assist attachment between the thermally insulating element and the housing of the aerosol-generating device. The downstream end face may directly abut the housing of the aerosol-generating device. The downstream end face may be glued to the housing of the aerosol-generating device.

The compartment, in which the induction coil may be arranged, may be hermetically sealed from the cavity by the thermally insulating element at the downstream end of the cavity. The compartment, in which the induction coil may be arranged, may be arranged surrounding the cavity. This compartment may be referred to as a coil compartment. The coil compartment may partly or fully surround the cavity. The coil compartment may extend along the full length of the cavity. The coil compartment may house the induction coil or multiple induction coils as described in more detail below. Due to the hermetic sealing between the cavity and the coil compartment at the downstream end of the cavity by means of the thermally insulating element, airflow is prevented between the coil compartment and the cavity at the downstream end of the cavity. Additionally, due to the thermally insulating elements being sealingly attached to the base of the cavity and thereby preventing lateral airflow into the cavity at the base of the cavity, airflow between the cavity and the coil compartment may be prevented in a lateral direction over the whole length of the coil compartment.

The aerosol-generating device may comprise an air inlet at the downstream end of the housing, wherein the air inlet may be in fluid connection with the downstream end of the compartment, in which the induction coil may be arranged. In other words, the aerosol-generating device may comprise a downstream air inlet connected with the coil compartment. The coil compartment may have an open upstream end. Air may be drawn through the coil compartment from the downstream air inlet through the coil compartment and out of the open upstream end of the coil compartment. The upstream open end of the coil compartment may be fluidly connected with the aperture arranged in the base of the cavity.

Ambient air may be drawn into the coil compartment through the downstream air Inlet. Subsequently, air may be drawn through the coil compartment, thereby cooling the induction coil arranged in the coil compartment. After passing the coil compartment, the air may be drawn out of the coil compartment through the open upstream end of the coil compartment. After exiting the coil compartment, the air may be guided in a U-shaped air channel towards the base of the cavity and through the air aperture. The air may then enter the cavity and flow through the aerosol-generating article arranged in the cavity. Air passing through the coil compartment may preheat the air for optimized aerosol generation when the air flows through the aerosol-generating article received in the cavity.

As an alternative embodiment to the thermally insulating element being sealingly attached to the housing at the downstream end of the housing, a gap may be provided between the thermally insulating element and the downstream end of the housing to enable a lateral airflow into the cavity at the downstream end of the cavity. In this embodiment, airflow is enabled between the coil compartment and the cavity at the downstream end of the cavity. In other words, a fluid connection is established in this embodiment between the coil compartment and the cavity at the downstream end of the cavity. The airflow is enabled adjacent the downstream end of the thermally insulating element. The airflow is enabled between the downstream end of the thermally insulating element and the housing of the aerosol-generating device.

The thermally insulating element may have a convex downstream end face. The convex downstream end face may enable a smooth airflow between the coil compartment and the cavity without negatively impairing the airflow.

The aerosol-generating device may comprise an air inlet adjacent an upstream end of the cavity. The air inlet may be in fluid communication with an upstream end of the compartment, in which the induction coil may be arranged.

The air inlet may be fluidly connected with the air aperture in the base of the cavity. Ambient air may flow through the air inlet adjacent the upstream end of the coil compartment towards the air aperture in the base of the cavity. The air may subsequently flow into the cavity and through the aerosol-generating article received in the cavity. Due to the gap being provided between the downstream end of the thermally insulating element and the housing of the aerosol-generating device, air may flow through the gap from the cavity into the coil compartment. This air may flow through the coil compartment and out of the coil compartment at an open upstream end of the coil compartment. The open upstream end of the coil compartment may be fluidly connected with the airflow path between the air inlet and the air aperture in the base of the cavity. A circular flow may be enabled between the cavity and the coil compartment by means of the gap between the thermally insulating element and the housing and, on the other hand, the open upstream end of the coil compartment. In this way, the induction coil arranged in the coil compartment may be cooled. At the same time, the air may be preheated for optimizing aerosol generation.

The aerosol-generating device may comprise a power supply. The power supply may be a direct current (DC) power supply. The power supply may be electrically connected to the first induction coil. In one embodiment, the power supply is a DC power supply having a DC supply voltage in the range of about 2.5 Volts to about 4.5 Volts and a DC supply current in the range of about 1 Amp to about 10 Amps (corresponding to a DC power supply in the range of about 2.5 Watts to about 45 Watts). The aerosol-generating device may advantageously comprise a direct current to alternating current (DC/AC) inverter for converting a DC current supplied by the DC power supply to an alternating current. The DC/AC converter may comprise a Class-D or Class-E power amplifier. The power supply may be configured to provide the alternating current.

The power supply may be a battery, such as a rechargeable lithium ion battery. Alternatively, the power supply may be another form of charge storage device such as a capacitor. The power supply may require recharging. The power supply may have a capacity that allows for the storage of enough energy for one or more uses of the aerosol-generating device. For example, the power supply may have sufficient capacity to allow for the continuous generation of aerosol for a period of around six minutes, corresponding to the typical time taken to smoke a conventional cigarette, or for a period that is a multiple of six minutes. In another example, the power supply may have sufficient capacity to allow for a predetermined number of puffs or discrete activations.

The power supply may be configured to operate at high frequency. As used herein, the term "high frequency oscillating current" means an oscillating current having a frequency of between 500 kilohertz and 30 megahertz. The high frequency oscillating current may have a frequency of from about 1 megahertz to about 30 megahertz, preferably from about 1 megahertz to about 10 megahertz and more preferably from about 5 megahertz to about 8 megahertz.

The induction heating arrangement may be configured to generate heat by means of induction. The induction heating arrangement comprises an induction coil and a susceptor arrangement. A single induction coil may be provided. A single susceptor arrangement may be provided. Preferably, more than a single induction coil is provided. A first induction coil and a second induction coil may be provided. Preferably, more than a single susceptor arrangement is provided. Preferably, a first susceptor arrangement and a second susceptor arrangement are provided. The induction coil may surround the susceptor arrangement. The first induction coil may surround the first susceptor arrangement. The second induction coil may surround the second susceptor arrangement. Alternatively, at least two induction coils may be provided surrounding a single susceptor arrangement. If more than one susceptor arrangement are provided, preferably electrically insulating elements are provided between the susceptor arrangements.

The susceptor arrangement may comprise a susceptor. The susceptor arrangement may comprise multiple susceptors. The susceptor arrangement may comprise blade shaped susceptors. The blade shaped susceptors may be arranged surrounding the cavity. The blade shaped susceptors may be arranged inside of the cavity. The blade shaped susceptors may be arranged for holding the aerosol-generating article, when the aerosol-generating article is inserted into the cavity. The blade shaped susceptors may have flared downstream ends to facilitate insertion of the aerosol-generating article into the blade shaped susceptors. Air may flow into the cavity through the air aperture in the base of the cavity. The air may subsequently enter into the aerosol-generating article at the upstream end face of the aerosol-generating article. Alternatively or additionally, air may flow between the sidewall of the cavity, preferably formed by the thermally insulating element, and the blade-shaped susceptors. The air may then enter into the aerosol-generating article through gaps between the blade-shaped susceptors. A uniform penetration of the aerosol-generating article with air may be achieved in this way, thereby optimizing aerosol generation.

The aerosol-generating device may comprise a flux concentrator. The flux concentrator may be made from a material having a high magnetic permeability. The flux concentrator may be arranged surrounding the induction heating arrangement. The flux concentrator may concentrate the magnetic field lines to the interior of the flux concentrator thereby increasing the heating effect of the susceptor arrangement by means of the induction coil.

The aerosol-generating device may comprise a controller. The controller may be electrically connected to the induction coil. The controller may be electrically connected to the first induction coil and to the second induction coil. The controller may be configured to control the electrical current supplied to the induction coils, and thus the magnetic field strength generated by the induction coils.

The power supply and the controller may be connected to the induction coil, preferably the first and second induction coils and configured to provide the alternating electric current to each of the induction coils independently of each other such that, in use, the induction coils each generate the alternating magnetic field. This means that the power supply and the controller may be able to provide the alternating electric current to the first induction coil on its own, to the second induction coil on its own, or to both induction coils simultaneously. Different heating profiles may be achieved in that way. The heating profile may refer to the temperature of the respective induction coil. To heat to a high temperature, alternating electric current may be supplied to both induction coils at the same time. To heat to a lower temperature or to heat only a portion of the aerosol-forming substrate of the aerosol-generating article, alternating electric current may be supplied to the first induction coil only. Subsequently, alternating electric current may be supplied to the second induction coil only.

The controller may be connected to the induction coils and the power supply. The controller may be configured to control the supply of power to the induction coils from the power supply. The controller may comprise a microprocessor, which may be a programmable microprocessor, a microcontroller, or an application specific integrated chip (ASIC) or other electronic circuitry capable of providing control. The controller may comprise further electronic components.

The controller may be configured to regulate a supply of current to the induction coils. Current may be supplied to one or both of the induction coils continuously following activation of the aerosol-generating device or may be supplied intermittently, such as on a puff by puff basis.

The power supply and the controller may be configured to vary independently the amplitude of the alternating electric current supplied to each of the first induction coil and the second induction coil. With this arrangement, the strength of the magnetic fields generated by the first and second induction coils may be varied independently by varying the amplitude of the current supplied to each coil. This may facilitate a conveniently variable heating effect. For example, the amplitude of the current provided to one or both of the coils may be increased during start-up to reduce the initiation time of the aerosol-generating device.

The first induction coil of the aerosol-generating device may form part of a first circuit. The first circuit may be a resonant circuit. The first circuit may have a first resonant frequency. The first circuit may comprise a first capacitor. The second induction coil may form part of a second circuit. The second circuit may be a resonant circuit. The second circuit may have a second resonant frequency. The first resonance frequency may be different from the second resonance frequency. The first resonance frequency may be identical to the second resonance frequency. The second circuit may comprise a second capacitor. The resonant frequency of the resonant circuit depends on the inductance of the respective induction coil and the capacitance of the respective capacitor.

The cavity of the aerosol-generating device may have an open end into which an aerosol-generating article is inserted. The cavity may have a closed end opposite the open end. The closed end may be the base of the cavity. The closed end may be closed except for the provision of the air apertures arranged in the base. The base of the cavity may be flat. The base of the cavity may be circular. The base of the cavity may be arranged upstream of the cavity. The open end may be arranged downstream of the cavity. The longitudinal direction may be the direction extending between the open and closed ends. The longitudinal axis of the cavity may be parallel with the longitudinal axis of the aerosol-generating device.

The cavity may be configured as a heating chamber. The cavity may have a cylindrical shape. The cavity may have a hollow cylindrical shape. The cavity may have a circular cross-section. The cavity may have an elliptical or rectangular cross-section. The cavity may have a diameter corresponding to the diameter of the aerosol-generating article.

As used herein, the term "proximal" refers to a user end, or mouth end of the aerosol-generating device, and the term "distal" refers to the end opposite to the proximal end. When referring to the cavity, the term "proximal" refers to the region closest to the open end of the cavity and the term "distal" refers to the region closest to the closed end.

As used herein, the term "length" refers to the major dimension in a longitudinal direction of the aerosol-generating device, of an aerosol-generating article, or of a component of the aerosol-generating device or an aerosol-generating article.

As used herein, the term "width" refers to the major dimension in a transverse direction of the aerosol-generating device, of an aerosol-generating article, or of a component of the aerosol-generating device or an aerosol-generating article, at a particular location along its length. The term "thickness" refers to the dimension in a transverse direction perpendicular to the width.

As used herein, the term "aerosol-forming substrate" relates to a substrate capable of releasing volatile compounds that can form an aerosol. Such volatile compounds may be released by heating the aerosol-forming substrate. An aerosol-forming substrate is part of an aerosol-generating article.

As used herein, the term "aerosol-generating article" refers to an article comprising an aerosol-forming substrate that is capable of releasing volatile compounds that can form an aerosol. For example, an aerosol-generating article may be an article that generates an aerosol that is directly inhalable by the user drawing or puffing on a mouthpiece at a proximal or user-end of the system. An aerosol-generating article may be disposable. An article comprising an aerosol-forming substrate comprising tobacco is referred to as a tobacco stick. The aerosol-generating article may be insertable into the cavity of the aerosol-generating device.

As used herein, the term "aerosol-generating device" refers to a device that interacts with an aerosol-generating article to generate an aerosol.

As used herein, the term "aerosol-generating system" refers to the combination of an aerosol-generating article, as further described and illustrated herein, with an aerosol-generating device, as further described and illustrated herein. In the system, the aerosol-generating article and the aerosol-generating device cooperate to generate a respirable aerosol. The invention may also relate to an aerosol-generating system.

As used herein, a "susceptor arrangement" means a conductive element that heats up when subjected to a changing magnetic field. This may be the result of eddy currents induced in the susceptor arrangement, hysteresis losses, or both eddy currents and hysteresis losses. During use, the susceptor arrangement is located in thermal contact or close thermal proximity with the aerosol-forming substrate of an aerosol-generating article received in the cavity of the aerosol-generating device. In this manner, the aerosol-forming substrate is heated by the susceptor arrangement such that an aerosol is formed.

The susceptor arrangement may have a cylindrical shape, preferably constituted by individual blade-shaped susceptors. The susceptor arrangement may have a shape corresponding to the shape of the corresponding induction coil. The susceptor arrangement may have a diameter smaller than the diameter of the corresponding induction coil such that the susceptor arrangement can be arranged inside of the induction coil.

The term "heating zone" refers to a portion of the length of the cavity which is at least partially surrounded by the induction coils so that the susceptor arrangement placed in or around the heating zone is inductively heatable by the induction coils. The heating zone may comprise a first heating zone and a second heating zone. The heating zone may be split into the first heating zone and the second heating zone. The first heating zone may be surrounded by the first induction coil. The second heating zone may be surrounded by the second induction coil. More than two heating zones may be provided. Multiple heating zones may be provided. An induction coil may be provided for each heating zone. One or more induction coils may be arranged moveable to surround the heating zones and configured for segmented heating of the heating zones.

The term "coil" as used herein is interchangeable with the terms "inductive coil" or "induction coil" or "inductor" or "inductor coil" throughout. A coil may be a driven (primary) coil connected to the power supply.

The heating effect may be varied by controlling the first and second induction coils independently. The heating effect may be varied by providing the first and second induction coils with different configurations so that the magnetic field generated by each coil under the same applied current is different. For example, the heating effect may be varied by forming the first and second induction coils from different types of wire so that the magnetic field generated by each coil under the same applied current is different. The heating effect may be varied by controlling the first and second induction coils independently and by providing the first and second induction coils with different configurations so that the magnetic field generated by each coil under the same applied current is different.

The induction coil(s) are each disposed at least partially around the heating zone. The induction coil may extend only partially around the circumference of the cavity in the region of the heating zone. The induction coil may extend around the entire circumference of the cavity in the region of the heating zone.

The induction coil(s) may be a planar coil disposed around part of the circumference of the cavity or fully around the circumference of the cavity. As used herein a "planar coil" means a spirally wound coil having an axis of winding which is normal to the surface in which the coil lies. The planar coil may lie in a flat Euclidean plane. The planar coil may lie on a curved plane. For example, the planar coil may be wound in a flat Euclidian plane and subsequently bent to lie on a curved plane.

Advantageously, the induction coil(s) is helical. The induction coil may be helical and wound around a central void in which the cavity is positioned. The induction coil may be disposed around the entire circumference of the cavity.

The induction coil(s) may be helical and concentric. The first and second induction coils may have different diameters. The first and second induction coils may be helical and concentric and may have different diameters. In such embodiments, the smaller of the two coils may be positioned at least partially within the larger of the first and second induction coils.

The windings of the first induction coil may be electrically insulated from the windings of the second induction coil.

The aerosol-generating device may further comprise one or more additional induction coils. For example, the aerosol-generating device may further comprise third and fourth induction coils, preferably associated with additional susceptors, preferably associated with different heating zones.

Advantageously, the first and second induction coils may have different inductance values. The first induction coil may have a first inductance and the second induction coil may have a second inductance which is less than the first inductance. This means that the magnetic fields generated by the first and second induction coils will have different strengths for a given current. This may facilitate a different heating effect by the first and second induction coils while applying the same amplitude of current to both coils. This may reduce the control requirements of the aerosol-generating device. Where the first and second induction coils are activated independently, the induction coil with the greater inductance may be activated at a different time to the induction coil with the lower inductance. For example, the induction coil with the greater inductance may be activated during operation, such as during puffing, and the induction coil with the lower inductance may be activated between operations, such as between puffs. Advantageously, this may facilitate the maintenance of an elevated temperature within the cavity between uses without requiring the same power as normal use. This 'pre-heat' may reduce the time taken for the cavity to return to the desired operating temperature once operation of the aerosol-generating device use is resumed. Alternatively, the first induction coil and the second induction coil may have the same inductance values.

The first and second induction coils may be formed from the same type of wire. Advantageously, the first induction coil is formed from a first type of wire and the second induction coil is formed from a second type of wire which is different to the first type of wire. For example, the wire compositions or cross-sections may differ. In this manner, the inductance of the first and second induction coils may be different even if the overall coil geometries are the same. This may allow the same or similar coil geometries to be used for the first and second induction coils. This may facilitate a more compact arrangement.

The first type of wire may comprise a first wire material and the second type of wire may comprise a second wire material which is different from the first wire material. The electrical properties of the first and second wire materials may differ. For example, first type of wire may have a first resistivity and the second type of wire may have a second resistivity which is different to the first resistivity.

Suitable materials for the induction coil(s) include copper, aluminium, silver and steel. Preferably, the induction coil is formed from copper or aluminium.

Where the first induction coil is formed from a first type of wire and the second induction coil is formed from a second type of wire which is different to the first type of wire, the first type of wire may have a different cross-section to the second type of wire. The first type of wire may have a first cross-section and the second type of wire may have a second cross-section which is different to the first cross-section. For example, the first type of wire may have a first cross-sectional shape and the second type of wire may have a second cross-sectional shape which is different to the first cross-sectional shape. The first type of wire may have a first thickness and the second type of wire may have a second thickness which is different to the first thickness. The cross-sectional shape and the thickness of the first and second types of wire may be different.

The susceptor arrangement may be formed from any material that can be inductively heated to a temperature sufficient to aerosolise an aerosol-forming substrate. Suitable materials for the susceptor arrangement include graphite, molybdenum, silicon carbide, stainless steels, niobium, aluminium, nickel, nickel containing compounds, titanium, and composites of metallic materials. Preferred susceptor arrangements comprise a metal or carbon. Advantageously the susceptor arrangement may comprise or consists of a ferromagnetic material, for example, ferritic iron, a ferromagnetic alloy, such as ferromagnetic steel or stainless steel, ferromagnetic particles, and ferrite. A suitable susceptor arrangement may be, or comprise, aluminium. The susceptor arrangement may comprise more than 5 percent, preferably more than 20 percent, more preferably more than 50 percent or more than 90 percent of ferromagnetic or paramagnetic materials. Preferred susceptor arrangements may be heated to a temperature in excess of 250 degrees Celsius.

The susceptor arrangement may be formed from a single material layer. The single material layer may be a steel layer.

The susceptor arrangement may comprise a non-metallic core with a metal layer disposed on the non-metallic core.

For example, the susceptor arrangement may comprise metallic tracks formed on an outer surface of a ceramic core or substrate.

The susceptor arrangement may be formed from a layer of austenitic steel. One or more layers of stainless steel may be arranged on the layer of austenitic steel. For example, the susceptor arrangement may be formed from a layer of austenitic steel having a layer of stainless steel on each of its upper and lower surfaces. The susceptor arrangement may comprise a single susceptor material. The susceptor arrangement may comprise a first susceptor material and a second susceptor material. The first susceptor material may be disposed in intimate physical contact with the second susceptor material. The first and second susceptor materials may be in intimate contact to form a unitary susceptor. In certain embodiments, the first susceptor material is stainless steel and the second susceptor material is nickel. The susceptor arrangement may have a two layer construction. The susceptor arrangements may be formed from a stainless steel layer and a nickel layer.

Intimate contact between the first susceptor material and the second susceptor material may be made by any suitable means. For example, the second susceptor material may be plated, deposited, coated, clad or welded onto the first susceptor material. Preferred methods include electroplating, galvanic plating and cladding.

The second susceptor material may have a Curie temperature that is lower than 500 degrees Celsius. The first susceptor material may be primarily used to heat the susceptor when the susceptor is placed in an alternating electromagnetic field. Any suitable material may be used. For example, the first susceptor material may be aluminium, or may be a ferrous material such as a stainless steel. The second susceptor material is preferably used primarily to indicate when the susceptor has reached a specific temperature, that temperature being the Curie temperature of the second susceptor material. The Curie temperature of the second susceptor material can be used to regulate the temperature of the entire susceptor during operation. Thus, the Curie temperature of the second susceptor material should be below the ignition point of the aerosol-forming substrate. Suitable materials for the second susceptor material may include nickel and certain nickel alloys. The Curie temperature of the second susceptor material may preferably be selected to be lower than 400 degrees Celsius, preferably lower than 380 degrees Celsius, or lower than 360 degrees Celsius. It is preferable that the second susceptor material is a magnetic material selected to have a Curie temperature that is substantially the same as a desired maximum heating temperature. That is, it is preferable that the Curie temperature of the second susceptor material is approximately the same as the temperature that the susceptor should be heated to in order to generate an aerosol from the aerosol-forming substrate. The Curie temperature of the second susceptor material may, for example, be within the range of 200 degrees Celsius to 400 degrees Celsius, or between 250 degrees Celsius and 360 degrees Celsius. In some embodiments it may be preferred that the first susceptor material and the second susceptor material are co-laminated. The co-lamination may be formed by any suitable means. For example, a strip of the first susceptor material may be welded or diffusion bonded to a strip of the second susceptor material. Alternatively, a layer of the second susceptor material may be deposited or plated onto a strip of the first susceptor material.

Preferably, the aerosol-generating device is portable. The aerosol-generating device may have a size comparable to a conventional cigar or cigarette. The system may be an electrically operated smoking system. The system may be a handheld aerosol-generating system. The aerosol-generating device may have a total length between approximately 30 millimetres and approximately 150 millimetres. The aerosol-generating device may have an external diameter between approximately 5 millimetres and approximately 30 millimetres.

The housing may be elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. Preferably, the material is light and non-brittle.

The housing may comprise a mouthpiece. The mouthpiece may comprise at least one air inlet and at least one air outlet. The mouthpiece may comprise more than one air inlet. One or more of the air inlets may reduce the temperature of the aerosol before it is delivered to a user and may reduce the concentration of the aerosol before it is delivered to a user.

Alternatively, the mouthpiece may be provided as part of an aerosol-generating article.

As used herein, the term "mouthpiece" refers to a portion of an aerosol-generating device that is placed into a user's mouth in order to directly inhale an aerosol generated by the aerosol-generating device from an aerosol-generating article received in the cavity of the housing.

The air inlet may be configured as a semi-open inlet. The semi-open inlet preferably allows air to enter the aerosol-generating device. Air or liquid may be prevented from leaving the aerosol-generating device through the semi-open inlet. The semi-open inlet may for example be a semi-permeable membrane, permeable in one direction only for air, but is air- and liquid-tight in the opposite direction. The semi-open inlet may for example also be a one-way valve. Preferably, the semi-open inlets allow air to pass through the inlet only if specific conditions are met, for example a minimum depression in the aerosol-generating device or a volume of air passing through the valve or membrane.

Operation of the heating arrangement may be triggered by a puff detection system. Alternatively, the heating arrangement may be triggered by pressing an on-off button, held for the duration of the user's puff. The puff detection system may be provided as a sensor, which may be configured as an airflow sensor to measure the airflow rate. The airflow rate is a parameter characterizing the amount of air that is drawn through the airflow path of the aerosol-generating device per time by the user. The initiation of the puff may be detected by the airflow sensor when the airflow exceeds a predetermined threshold. Initiation may also be detected upon a user activating a button.

The sensor may also be configured as a pressure sensor to measure the pressure of the air inside the aerosol-generating device which is drawn through the airflow path of the device by the user during a puff. The sensor may be configured to measure a pressure difference or pressure drop between the pressure of ambient air outside of the aerosol-generating device and of the air which is drawn through the device by the user. The pressure of the air may be detected at the air inlet, the mouthpiece of the device, the cavity such as the heating chamber or any other passage or chamber within the aerosol-generating device, through which the air flows. When the user draws on the aerosol-generating device, a negative pressure or vacuum is generated inside the device, wherein the negative pressure may be detected by the pressure sensor. The term "negative pressure" is to be understood as a pressure which is relatively lower than the pressure of ambient air. In other words, when the user draws on the device, the air which is drawn through the device has a pressure which is lower than the pressure off ambient air outside of the device. The initiation of the puff may be detected by the pressure sensor if the pressure difference exceeds a predetermined threshold.

The aerosol-generating device may include a user interface to activate the aerosol-generating device, for example a button to initiate heating of the aerosol-generating device or display to indicate a state of the aerosol-generating device or of the aerosol-forming substrate.

The aerosol-generating system is a combination of an aerosol-generating device and one or more aerosol-generating articles for use with the aerosol-generating device. However, the aerosol-generating system may include additional components, such as, for example a charging unit for recharging an on-board electric power supply in an electrically operated or electric aerosol-generating device.

The aerosol-forming substrate may comprise nicotine. The nicotine-containing aerosol-forming substrate may be a nicotine salt matrix. The aerosol-forming substrate may comprise plant-based material. The aerosol-forming substrate may comprise tobacco. The aerosol-forming substrate may comprise a tobacco-containing material including volatile tobacco flavour compounds which are released from the aerosol-forming substrate upon heating. Alternatively, the aerosol-forming substrate may comprise a non-tobacco material.

The aerosol-forming substrate may comprise homogenised plant-based material. The aerosol-forming substrate may comprise homogenised tobacco material. Homogenised tobacco material may be formed by agglomerating particulate tobacco. In a particularly preferred embodiment, the aerosol-forming substrate may comprise a gathered crimped sheet of homogenised tobacco material. As used herein, the term 'crimped sheet' denotes a sheet having a plurality of substantially parallel ridges or corrugations.

The aerosol-forming substrate may comprise at least one aerosol-former. An aerosol-former is any suitable known compound or mixture of compounds that, in use, facilitates formation of a dense and stable aerosol and that is substantially resistant to thermal degradation at the temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Preferred aerosol formers are polyhydric alcohols or mixtures thereof, such as triethylene glycol, 1,3-butanediol. Preferably, the aerosol former is glycerine. Where present, the homogenised tobacco material may have an aerosol-former content of equal to or greater than 5 percent by weight on a dry weight basis, and preferably from about 5 percent to about 30 percent by weight on a dry weight basis. The aerosol-forming substrate may comprise other additives and ingredients, such as flavourants.

In any of the above embodiments, the aerosol-generating article and the cavity of the aerosol-generating device may be arranged such that the aerosol-generating article is partially received within the cavity of the aerosol-generating device. The cavity of the aerosol-generating device and the aerosol-generating article may be arranged such that the aerosol-generating article is entirely received within the cavity of the aerosol-generating device.

The aerosol-generating article may be substantially cylindrical in shape. The aerosol-generating article may be substantially elongate. The aerosol-generating article may have a length and a circumference substantially perpendicular to the length. The aerosol-forming substrate may be provided as an aerosol-forming segment containing an aerosol-forming substrate. The aerosol-forming segment may be substantially cylindrical in shape. The aerosol-forming segment may be substantially elongate. The aerosol-forming segment may also have a length and a circumference substantially perpendicular to the length.

The aerosol-generating article may have a total length between approximately 30 millimetres and approximately 100 millimetres. In one embodiment, the aerosol-generating article has a total length of approximately 45 millimetres. The aerosol-generating article may have an external diameter between approximately 5 millimetres and approximately 12 millimetres. In one embodiment, the aerosol-generating article may have an external diameter of approximately 7.2 millimetres.

The aerosol-forming substrate may be provided as an aerosol-forming segment having a length of between about 7 millimetres and about 15 millimetres. In one embodiment, the aerosol-forming segment may have a length of approximately 10 millimetres. Alternatively, the aerosol-forming segment may have a length of approximately 12 millimetres.

The aerosol-generating segment preferably has an external diameter that is approximately equal to the external diameter of the aerosol-generating article. The external diameter of the aerosol-forming segment may be between approximately 5 millimetres and approximately 12 millimetres. In one embodiment, the aerosol-forming segment may have an external diameter of approximately 7.2 millimetres.

The aerosol-generating article may comprise a filter plug. The filter plug may be located at a downstream end of the aerosol-generating article. The filter plug may be a cellulose acetate filter plug. The filter plug may be a hollow cellulose acetate filter plug. The filter plug is approximately 7 millimetres in length in one embodiment, but may have a length of between approximately 5 millimetres to approximately 10 millimetres.

As used herein, the terms 'upstream' and 'downstream' are used to describe the relative positions of components, or portions of components, of the aerosol-generating device in relation to the direction in which a user draws on the aerosol-generating device during use thereof.

The aerosol-generating article may comprise an outer paper wrapper. Further, the aerosol-generating article may comprise a separation between the aerosol-forming substrate and the filter plug. The separation may be approximately 18 millimetres, but may be in the range of approximately 5 millimetres to approximately 25 millimetres.

Features described in relation to one embodiment may equally be applied to other embodiments of the invention.

FIG. 1 shows a proximal or downstream portion of an aerosol-generating device. The aerosol-generating device comprises a cavity 10 for insertion of an aerosol-generating article 12. The inserted aerosol-generating article 12 can be seen in FIGS. 2 and 4. The cavity 10 is configured as a heating chamber.

Inside of the cavity 10, a susceptor arrangement 14 is arranged. The susceptor arrangement 14 comprises multiple susceptor blades. The individual susceptor blades are flared at respective downstream ends to ease insertion of the aerosol-generating article 12 into the cavity 10. The inner diameter of the susceptor arrangement 14 corresponds or is slightly smaller than the outer diameter of the aerosol-generating article 12. The aerosol-generating article 12 is held by the susceptor arrangement 14 after insertion of the aerosol-generating article 12 into the cavity 10.

The susceptor arrangement 14 is part of an induction heating arrangement. The induction heating arrangement comprises an induction coil 16. The induction coil 16 is arranged at least partly surrounding the cavity 10. The induction coil 16 surrounds the full circumference of the cavity 10. The induction coil 16 is arranged surrounding the susceptor arrangement 14. The induction coil 16 surrounds the part of the cavity 10, in which a substrate portion 18 of the aerosol-generating article 12 is received. A filter portion 20 of the aerosol-generating article 12 sticks out of the cavity 10 after insertion of the aerosol-generating article 12 into the cavity 10. A user draws on the filter portion 20.

More than one induction coil 16 may be provided. Preferably, two induction coils 16 or more than two induction coils 16 are provided. The induction coils 16 may be part of the induction heating arrangement. The induction coils 16 may be separately controllable to enable heating of separate heating zones within the cavity 10. Exemplarily, a first induction coil may be arranged surrounding a downstream portion of the cavity 10 corresponding to a downstream heating zone, while a second induction coil may be arranged surrounding an upstream portion of the cavity 10 corresponding to an upstream heating zone.

The aerosol-generating device may comprise further elements not shown in the figures such as a controller for controlling the induction heating arrangement. The controller may be configured to separately control individual coils if the induction heating arrangement comprises more than one induction coil 16. The aerosol-generating device may comprise a power supply such as a battery. The controller may be configured to control the supply of electrical energy from the power supply to the induction coil 16 or to the individual induction coils 16.

Between the susceptor arrangement 14 and the induction coil 16, a thermally insulating element 22 is arranged. The thermally insulating element 22 forms the sidewall of the cavity 10. The thermally insulating element 22 has an elongate extension. The thermally insulating element 22 has a hollow cylindrical shape. The thermally insulating element 22 is attached to a housing 24 of the aerosol-generating device. Preferably, the thermally insulating element 22 is attached to a downstream end 26 of the housing 24 as depicted in FIG. 1. Additionally, the thermally insulating element 22 is attached to a base 28 of the cavity 10 at a downstream end of the cavity 10. In the base 28 of the cavity 10, one or more air apertures 30 are arranged.

The air aperture 30 has an elongate extension parallel to the longitudinal axis of the aerosol-generating device. The air aperture 30 allows air to enter into the cavity 10 at an upstream end 32 of the cavity 10. The thermally insulating element 22 prevents air from entering into the cavity 10 in a lateral direction. In other words, the thermally insulating element 22 is arranged surrounding the cavity 10 such that the air can only enter the cavity 10 at the upstream end 32 of the cavity 10 and can only exit the cavity 10 at an open downstream end of the cavity 10.

The induction coil 16 is arranged in a coil compartment 34. The coil compartment 34 is arranged surrounding the thermally insulating element 22. A layered structure is provided with the cavity 10 centrally in the middle. Surrounding the cavity 10, the thermally insulating element 22 is provided. Surrounding the thermally insulating element 22, the coil compartment 34 is arranged. Surrounding the coil compartment 34, the housing 24 of the aerosol-generating device is provided.

An air inlet 36 is provided to enable ambient air to enter the coil compartment 34. The air inlet 36 is arranged at the downstream end 26 of the housing 24. The air inlet 36 is preferably arranged adjacent the coil compartment 34. The air inlet 36 is provided between the outer circumference of the housing 24 and the part of the downstream end 26 of the housing 24 connected to the thermally insulating element 22. The air inlet 36 enables that ambient air is drawn into the coil compartment 34. The air inlet 36 is preferably not directly fluidly connected with the cavity 10. The upstream end of the coil compartment 34 is open. The air drawn into the coil compartment 34 through the air inlet 36 exits the coil compartment 34 at the open upstream end of the coil compartment 34. After exiting the coil compartment 34, the air flows in a U-shape towards the air aperture 30 arranged in the base 28 of the cavity 10. The air then enters into the cavity 10 at the upstream end 32 of the cavity 10. Air flowing through the coil compartment 34 before entering the cavity 10 is utilized to cool the induction coil 16 arranged in the coil compartment 34.

In FIG. 1, a resilient sealing element 38 is shown at the downstream end of the cavity 10. The resilient sealing element 38 is arranged surrounding the downstream end of the cavity 10. The resilient sealing element 38 has a circular shape. The resilient sealing element 38 has a funnel shape facilitating insertion of the aerosol-generating article 12. The resilient sealing element 38 applies pressure to the aerosol-generating article 12 after insertion of the aerosol-generating article 12 to hold the aerosol-generating article 12 in place. The resilient sealing element 38 is air impenetrable to prevent air from escaping the cavity 10 except for escaping through the aerosol-generating article 12.

Figure 2:
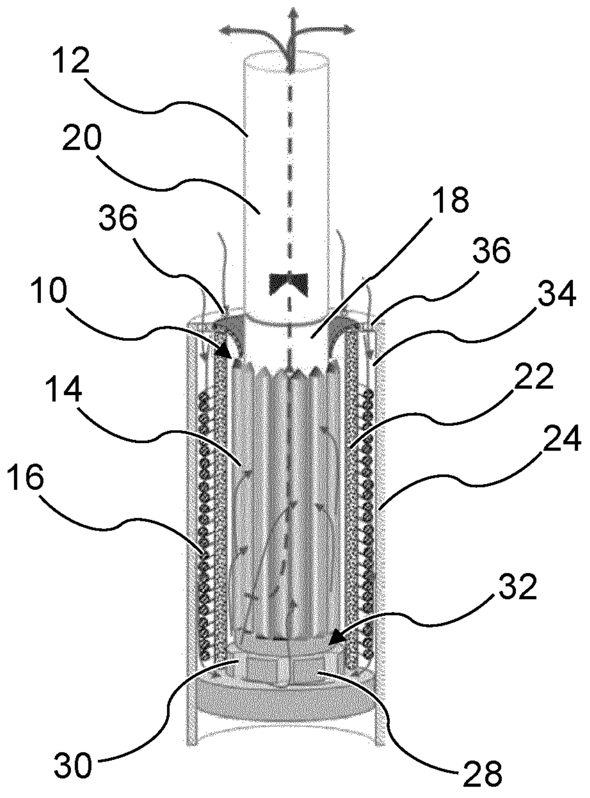
FIG. 2 shows an illustrative view of the aerosol-generating device with inserted aerosol-generating article and with indicated airflow.

FIG. 2 shows an illustration of the aerosol-generating device, in which an aerosol-generating article 12 is inserted into the cavity 10. The substrate portion 18 of the aerosol-generating article 12 is received in the cavity 10. A filter portion 20 of the aerosol-generating article 12 may stick out of the cavity 10 for a user to draw on the aerosol-generating article 12.

In addition to the inserted aerosol-generating article 12, the airflow is indicated in FIG. 2. Air flows into the aerosol-generating device through the air inlet 36. More than one air inlet 36 may be provided. The air flows through the coil compartment 34. After exiting the coil compartment 34, the air flows into the cavity 10 through the air aperture 30 arranged at the base 28 of the cavity 10. The air subsequently flows into the aerosol-generating article 12 through gaps provided between the individual susceptor blades.

Figure 3:
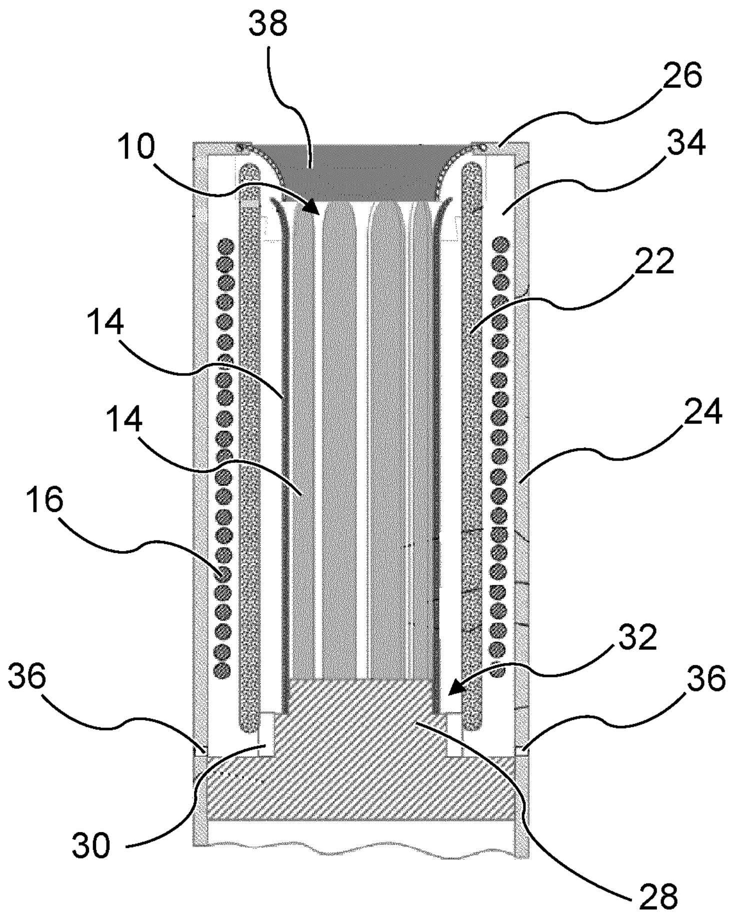
FIG. 3 shows a cross-sectional view of a further embodiment of an aerosol-generating device.

FIG. 3 shows a further embodiment, in which the downstream end of the thermally insulating element 22 is not attached to the downstream end of the housing 24 of the aerosol-generating device. Contrary, a gap is provided between the downstream end of the thermally insulating element 22 and the housing 24 of the aerosol-generating device. In addition, the air inlet 36 in the embodiment shown in FIG. 3 is placed differently. The air inlet 36 is placed in the sidewall of the housing 24 of the aerosol-generating device. In other words, the air inlet 36 is placed in the outer circumference of the housing 24 of the aerosol-generating device. The air inlet 36 is arranged adjacent the upstream end of the cavity 10.

Figure 4:
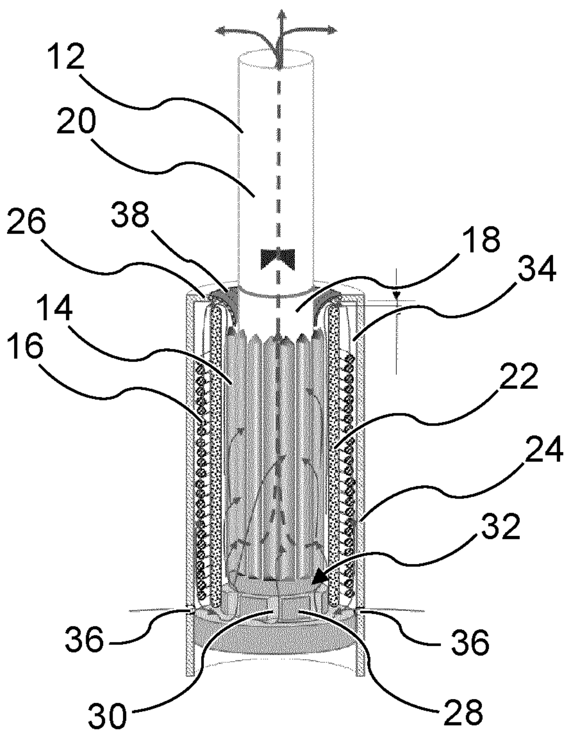
FIG. 4 shows an illustrative view of the aerosol-generating article of FIG. 3 with inserted aerosol-generating article and with indicated airflow.

As depicted in FIG. 4, when air is drawn into the cavity 10 through the air inlet 36, the air is drawn directly from the air inlet 36 towards the air aperture 30 arranged in the base 28 of the cavity 10. When air is drawn into the cavity 10, this air can, in contrast to the embodiment depicted in FIGS. 1 and 2, not only exit the cavity 10 through the inserted aerosol-generating article 12. Rather, air is drawn out of the cavity 10 through the gap between the thermally insulating element 22 and the housing 24 into the coil compartment 34. Air drawn into the coil compartment 34 may, similar to the embodiment shown in FIGS. 1 and 2, exit the coil compartment 34 through the open upstream end of the coil compartment 34. The air exiting the coil compartment 34 is drawn into the cavity 10 again through the air aperture 30 arranged in the base 28 of the cavity 10. In the embodiment shown in FIG. 3, air may cycle between the cavity 10 and the coil compartment 34. This has various benefits. The induction coil 16 is cooled. Additionally or alternatively, the air is preheated before entering or re-entering into the cavity 10.

The invention claimed is:

1. An aerosol-generating device, comprising:

a cavity configured to receive an aerosol-generating article comprising an aerosol-forming substrate, wherein the cavity comprises a base, and wherein the base comprises at least one air aperture;

an induction heating arrangement comprising a susceptor arrangement and an induction coil, wherein the susceptor arrangement has one or more sidewalls, and wherein the induction heating arrangement is arranged at least partly surrounding or forming the cavity;

a thermally insulating element arranged between the susceptor arrangement and the induction coil, wherein the thermally insulating element is sealingly attached to the base so as to prevent lateral airflow in a direction perpendicular to a longitudinal axis of the aerosol-generating device into the cavity at the base of the cavity, wherein the one or more sidewalls of the susceptor arrangement are formed from blade-shaped susceptors, and wherein the one or more sidewalls of the susceptor arrangement are permeable and configured for lateral airflow to enter the cavity in the direction perpendicular to the longitudinal axis of the aerosol-generating device; and a gap provided between the one or more sidewalls of the susceptor arrangement and one or more sidewalls of the thermal insulating element, the gap allowing axial airflow within the gap.

2. The aerosol-generating device according to claim 1, further comprising a housing, wherein the cavity is arranged in a downstream end of the housing, and wherein the thermally insulating element is sealingly attached to the downstream end of the housing so as to prevent lateral airflow into the cavity at the downstream end of the cavity.

3. The aerosol-generating device according to claim 2, wherein the thermally insulating element has a downstream end face, and wherein the downstream end face is flat.

4. The aerosol-generating device according to claim 2, further comprising a compartment in which the induction coil is arranged, wherein the compartment is hermetically sealed from the cavity by the thermally insulating element at the downstream end of the cavity.

5. The aerosol-generating device according to claim 4, further comprising an air inlet at the downstream end of the housing, wherein the air inlet is in fluid connection with the downstream end of the compartment in which the induction coil is arranged.

6. The aerosol-generating device according to claim 1, further comprising a housing, wherein the cavity is arranged in a downstream end of the housing, and wherein a gap is provided between the thermally insulating element and the downstream end of the housing to enable a lateral airflow into the cavity at the downstream end of the cavity.

7. The aerosol-generating device according to claim 6, wherein the thermally insulating element has a convex downstream end face.

8. The aerosol-generating device according to claim 6, further comprising a compartment in which the induction coil is arranged, wherein a fluid connection is established between the compartment and the cavity at the downstream end of the cavity.

9. The aerosol-generating device according to claim 8, further comprising an air inlet adjacent an upstream end of the cavity, wherein the air inlet is in fluid communication with an upstream end of the compartment in which the induction coil is arranged.

10. The aerosol-generating device according to claim 1, wherein the thermally insulating element at least partly forms a sidewall of the cavity.

11. The aerosol-generating device according to claim 1, wherein the thermally insulating element extends partly or fully along a length of the cavity.

12. The aerosol-generating device according to claim 1, wherein the thermally insulating element is glued to the base of the cavity.

* * * * *